(12) United States Patent
Rybski (10) Patent No.: US 11,078,964 B1
(45) Date of Patent: Aug. 3, 2021

(54) HUB BEARING UNIT WITH COMBINATION DISPLACEMENT LIMITER AND SEAL

(71) Applicant: AKTIEBOLAGET SKF, Gothenburg (SE)

(72) Inventor: David Christopher Rybski, White Lake, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/742,754

(22) Filed: Jan. 14, 2020

(51) Int. Cl.
| F16C 33/76 | (2006.01) |
| F16C 33/78 | (2006.01) |
| B60B 27/06 | (2006.01) |
| B60B 27/00 | (2006.01) |

(52) U.S. Cl.
CPC ...... F16C 33/7843 (2013.01); B60B 27/0005 (2013.01); B60B 27/065 (2013.01)

(58) Field of Classification Search
CPC .............. B60B 27/0005; B60B 27/001; B60B 27/0073; B60B 27/065; F16C 19/186; F16C 19/386; F16C 33/7843; F16C 33/7846; F16C 33/7859; F16C 33/7863; F16C 33/7866; F16C 33/7879; F16C 33/7883; F16C 41/007; F16C 2326/02
See application file for complete search history.

(56) References Cited

U.S. PATENT DOCUMENTS

| 8,845,203 | B2 | 9/2014 | Meeker et al. | |
| 9,283,808 | B2 | 3/2016 | Meeker et al. | |
| 2004/0170344 | A1* | 9/2004 | Tajima | G01P 3/443 |
| | | | | 384/448 |
| 2008/0187262 | A1* | 8/2008 | Niebling | F16C 19/52 |
| | | | | 384/477 |

FOREIGN PATENT DOCUMENTS

DE  102017129960 A1  6/2019

* cited by examiner

*Primary Examiner* — Phillip A Johnson
(74) *Attorney, Agent, or Firm* — J-TEK Law PLLC; Scott T. Wakeman; Mark A. Ussai (57) ABSTRACT

A hub bearing unit includes an inner ring having inboard and outboard axial ends and a bearing inner race on an outer surface. An outer ring disposed about the inner ring has inboard and outboard axial ends and a bearing outer race on an inner surface. One ring is coupled with a wheel and rotatable about an axis and the other ring is fixedly coupled with a frame. An annular displacement limiter extends radially from one ring and has a circumferential stop surface spaced radially from a surface of the other ring. The stop surface engages with the ring surface when the ring displaces radially relative to the other ring. A seal includes an annular sealing member coupled with one ring and is sealingly engageable with the limiter or is mounted on the limiter and sealingly engageable with one ring or a rigid seal member coupled with one ring.

20 Claims, 10 Drawing Sheets

HUB BEARING UNIT WITH COMBINATION DISPLACEMENT LIMITER AND SEAL

BACKGROUND OF THE INVENTION

The present invention relates to bearings, and more particularly to wheel hub units.

Wheel hub units are known and are typically provided to rotatably couple a wheel to a vehicle frame. A wheel hub unit includes an inner ring, and outer ring and rolling elements disposed between the inner and outer rings, with the wheel being mounted to one ring and the other ring being connected with the frame through a shaft, a suspension assembly or a steering mechanism. When the wheel experiences a side impact of a sufficient magnitude, the relative displacement between the ring coupled with the wheel and the other ring can cause the rolling elements to impact the races with a sufficient force to indent the race surfaces. Such indentations or "brinelling" can cause adverse operation of the bearings and can lead to premature wear and failure of the bearing races.

SUMMARY OF THE INVENTION

In one aspect, the present invention is a hub bearing unit for rotatably coupling a wheel with a vehicle frame. The hub bearing unit comprises an inner ring having an inboard axial end, an outboard axial end, an outer circumferential surface and at least one bearing inner race disposed on the outer surface. An outer ring is disposed about the inner ring and has an inboard axial end, an outboard axial end, an inner circumferential surface and at least one bearing outer race disposed on the ring inner surface. One of the inner ring and the outer ring is coupled with the wheel so as to be rotatable about a central axis and the other one of the inner ring and the outer ring being fixedly coupled with the frame. A plurality of rolling elements are rollable upon the inner and outer races to rotatably couple the inner and outer rings. Further, a generally annular displacement limiter extends radially from the inner ring outer surface or from the outer ring inner surface. The limiter has a circumferential stop surface spaced radially from the outer ring inner surface or from the inner ring outer surface. The stop surface engages with the outer ring or with the inner ring when one of the inner ring and the outer ring displaces radially relative to the other one of the inner ring and the outer ring. Furthermore, a seal includes an annular sealing member coupled with one of the inner and outer rings and is sealingly engageable with the limiter or is mounted on the limiter and sealingly engageable with one of the inner and outer rings or with a rigid seal member coupled with one of the inner and outer rings.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
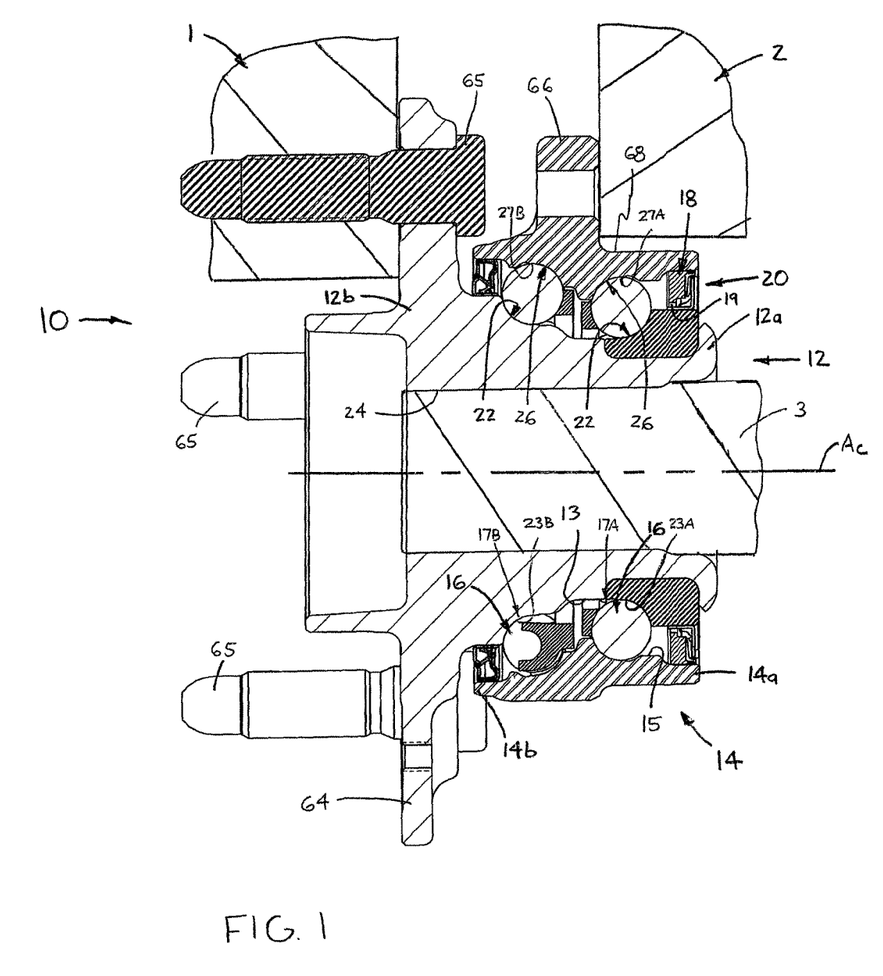
FIG. 1 is an axial cross-sectional view of a hub bearing unit in accordance with the present invention, shown with a first construction combination displacement limiter and seal.

Referring now to the drawings in detail, wherein like numbers are used to indicate like elements throughout, there is shown in FIGS. 1-10 a hub bearing unit 10 for rotatably coupling a wheel 1 with a vehicle 2 (as indicated in FIG. 1), preferably through a steering mechanism, a suspension or a powertrain. The hub bearing unit 10 basically comprises an inner ring 12, an outer ring 14 disposed about the inner ring 12, at least one plurality or "row" of rolling elements 16 disposed between the inner and outer rings 12, 14, an annular displacement limiter 18 for limiting relative radial displacement between the rings 12, 14 and a seal 20 coupled with or engaged with the limiter 18. More specifically, the inner ring 12 is generally cylindrical and has an inboard axial end 12a, an outboard axial end 12b, an outer circumferential surface 13 and at least one bearing inner race 22 disposed on the outer surface 13, and preferably has a central bore 24 configured to receive a shaft 3 coupled with the frame of the vehicle 2 or with a powertrain (not shown). The outer ring 14 is generally tubular and has an inboard axial end 14a, an outboard axial end 14b, an inner circumferential surface 15 and at least one bearing outer race 26 disposed on the ring inner surface 15.

As discussed in further detail below, one of the inner and outer rings 12, 14 is coupled with the wheel 1 so as to be rotatable about a central axis $A_C$ and the other one of the inner and outer rings 12, 14 is fixedly or "non-rotatably" coupled with the frame 2. Further, the plurality of rolling elements 16 are rollable simultaneously upon the inner and outer races 22, 26 so as to rotatably couple the inner and outer rings 12, 14. Preferably, the rolling elements 16 are generally spherical balls, but may alternatively be cylindrical rollers, tapered rollers, needles or any other type of rolling element. Preferably, the inner ring 12 and the outer ring 14 are formed of a metallic material, such as high or medium carbon steel, and the rolling elements 16 are either formed of a metallic material, for example chromium steel, or a ceramic material such as aluminum oxide.

The displacement limiter 18 is generally annular and is formed of a substantially rigid material, preferably a metallic material such as low carbon steel, but may be formed of any appropriate material, e.g., a rigid polymeric material or a ceramic material. The limiter 18 extends radially from the inner ring outer surface 13 or from the outer ring inner surface 15 and has a circumferential stop surface 19 spaced radially from the outer ring inner surface 15 or from the inner ring outer surface 13. In other words, when the limiter 18 extends radially outwardly from the outer surface 13 of the inner ring 12, the stop surface 19 is spaced radially inwardly from the inner surface 15 of the outer ring 14 or from an inner circumferential surface of a component disposed within the ring inner surface 15. Conversely, when the limiter 18 extends radially inwardly from the inner surface 15 of the outer ring 14, the stop surface 19 is spaced radially outwardly from the outer surface 13 of the inner ring 12 or from an outer circumferential surface of a component disposed on the ring outer surface 13. In either case, the stop surface 19 engages with the outer ring inner surface 13 or with the inner ring outer surface 15, i.e., directly or through a connected component, when one of the inner and outer rings 12, 14 displaces radially relative to the other one of the inner and outer rings 12, 14 so as to "limit" the total potential relative radial displacement between the rings 12, 14 and thereby reduce or eliminate any potential impact damage to the bearing races 22, 26.

More specifically, an annular control gap GC is defined between the stop surface 19 of the displacement limiter 18 and either the outer ring inner surface 15, the inner ring outer surface 13 or another circumferential surface of a component disposed on either ring 12, 14, as appropriate. The limiter 18 is sized, i.e., radially, such that the control gap GC has a predetermined radial length LR to limit the relative radial displacement between the inner and outer rings 12, 14 to the control gap radial length LR. The control gap GC is sized such that, under normal vehicle operating conditions, the one ring 12 or 14 coupled with the wheel 1 is freely rotatable about the central axis $A_C$.

However, when an impact event occurs (e.g., wheel 1 hitting curb, pothole, etc.), the resulting radial displacement of the wheel-coupled ring 12 or 14 relative to the other ring 14, 12 is prevented from exceeding the radial length LR of the control gap GC by the displacement limiter 18. As discussed above, excessive radial displacements of one ring 12 or 14 relative to the other ring 14, 12 can cause the rolling elements 16 to impact against the outer surfaces 22a, 26a of the races 22, 26 with sufficient force to indent the surfaces 22a, 26a, such indentations being referred to as "brinelling". Brinelling typically leads to excessive vibration or chattering of the rolling elements 16, and accelerates wear of the race surfaces 22a, 26a, leading to galling and/or spalling or the flaking off of bearing material. Thus, by limiting relative radial displacement between the inner and outer rings 12, 14, the displacement limiter 18 functions as an "anti-brinelling" device. Preferably, the radial length LR of the control gap GC has a value of about 0.3 millimeters or less (i.e., no greater than about 0.3 mm), and may be within a range of between about 0.15 millimeters (or even 0.04 millimeters) and about 0.30 millimeters. Such values of the control gap radial length LR have been determined to prevent radial displacements of a magnitude that may cause brinelling impacts while still permitting free relative rotation between the rings 12, 14 during normal vehicle operating conditions.

Further, the displacement limiter 18 is preferably located axially between the plurality of rolling elements 16, which preferably form an inboard row 17A of rolling elements 16 as described below, and the inboard axial end 12a, 14a of each one of the inner and outer rings 12, 14, respectively. As such, the limiter 18 functions to more effectively limit relative radial displacement between the inboard axial end 12a of the inner ring 12 and the inboard axial end 14a of the outer ring 14, thereby better preserving the integrity of the surfaces of the inboard inner and outer races 23A, 27A, respectively, as described below.

Furthermore, the seal 20 includes a generally annular sealing member 30, which is preferably formed of an elastomeric material (but may be formed of any other appropriate material) and includes one or more sealing lips 36. An important aspect of the present invention is that the seal 20 is either coupled with or is sealingly engaged with the displacement limiter 18. More specifically, in certain constructions, the annular sealing member 30 is mounted on the limiter 18 and is sealingly engageable with one of the inner and outer rings 12, 14 or/and with a rigid seal member 32 coupled with one of the inner and outer rings 12, 14, depending on the number and structure of one or more sealing lips 36, as depicted in FIGS. 1-5. In other constructions as shown in FIGS. 6-10, the annular sealing member 30 is coupled with one of the inner and outer rings 12, 14, preferably through a rigid retainer 34 as described below, and is sealingly engageable with the limiter 18.

In either construction, the seal 20 and limiter 18 are preferably provided as a unitary assembly or "cassette" type of seal. That is, all of the seal components, i.e., the combination of the rigid retainer 34, the sealing member 30 and the limiter 18 or the combination of the limiter 18, the sealing member 30 and the rigid seal member 32, are each preferably provided as a unit which can be installed in the wheel hub unit 10, and alternatively removed therefrom, as a single device. However, any or all of the seal components may be alternatively separately installed or removed from the wheel hub unit 10, and/or the limiter 18 may be integrally formed with one of the rings 12, 14 with the sealing member 30 being thereafter attached to or installed against the integral limiter 18. Having described the basic components above, these and other structural components of the hub bearing unit 10 are described in detail below.

Referring to FIGS. 3-5 and 8-10, the displacement limiter 18 preferably includes a generally annular body 40 with an inner radial end 41A, an outer radial end 41B and opposing axial ends 40a, 40b having radial end surfaces 42A, 42B. The body 40 is preferably generally cylindrical such that the two radial end surfaces 42A, 42B are substantially flat and parallel, but may be formed in any other appropriate manner. For example, the body 40 may be fabricated so as to be tapering with generally frustoconical end surfaces 42A, 42B (not shown). Further, the annular body 40 has at least one circumferential surface 43 or 44 providing the stop surface 19, and when formed separate from both of the rings 12, 14, has an opposing circumferential surface 44, 43, respectively.

More specifically, when the displacement limiter 18 is connected with the inner ring 12, the inner radial end 41A is coupled with or integrally formed with the inner ring 12 and the outer radial end 41B is spaced radially inwardly from the outer ring inner surface 15. When formed separately from the ring 12, the limiter body 40 further has an inner circumferential surface 43 engaged with the inner ring 12, such as for example, coupled by an interference fit with the outer surface 13, disposed within an annular groove (not shown) extending inwardly from the outer surface 13, or threadably engaged with the outer surface 13. Alternatively, when the limiter 18 is connected with the outer ring 14, the body outer radial end 41B is coupled with or integrally formed with the outer ring 14 and the inner radial end 41A is spaced radially outwardly from the inner ring outer surface 13. Similarly as above, when formed separately from the ring 14, the body 40 further has an outer circumferential surface 44 engaged with the outer ring 14 in any appropriate manner, e.g., frictionally engaged with the inner surface 15, disposed in an annular groove (not shown) extending radially outwardly from the inner surface 15, threadably engaged with the inner surface 15, etc. Further with either construction, the annular body 40 may either be removably coupled with the inner ring 12 or with the outer ring 14 or may be permanently or semi-permanently attached to either ring 12, 14, such as by welding, brazing, etc.

Referring now to FIGS. 1-5, when the annular sealing member 30 is disposed on the displacement limiter 18, the limiter 18 is preferably coupled with the outer ring 14 and the wheel 1 is coupled with the inner ring 12, such that the inner ring 12 is rotatable about the central axis $A_C$. Preferably, the inner radial end 41A of the limiter body 40 has a counterbore section 45 adjacent to the stop surface 19 to provide clearance for a sealing lip 36, as discussed below, and the outer radial end 41B has an axial extension 46. The axial extension 46 provides inner and outer circumferential surfaces 46a, 46b for supporting sections of the annular sealing member 30.

Further, the sealing member 30 is preferably bonded to at least the outwardly-facing radial surface 42B of the limiter annular body 40, and preferably also to the counterbore section 45 and the axial extension 46. Preferably, the sealing member 30 includes a primary, generally axial sealing lip 37 sealingly engageable with a radial surface 33 of the rigid seal member 32 and at least one radial sealing lip 38. The radial sealing lip 38 extends generally radially inwardly from the limiter counterbore section 45 and is preferably sealingly engageable with an outer circumferential surface 35A of the rigid member 32 but may alternatively be engageable with a portion of the outer surface 13 of the inner ring 12.

Figure 4:
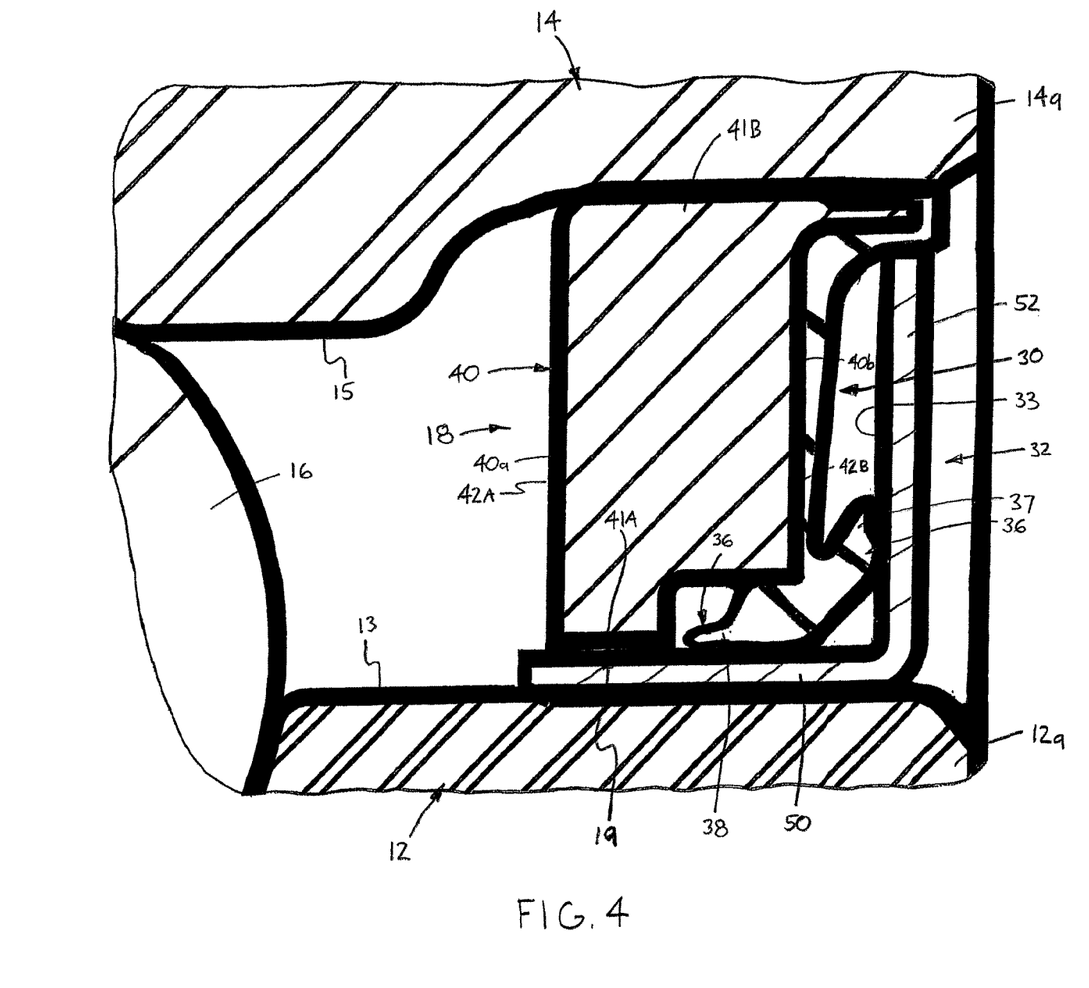
FIG. 4 is another view of portion of FIG. 3, showing the limiter engaged with the inner ring.
Figure 5:
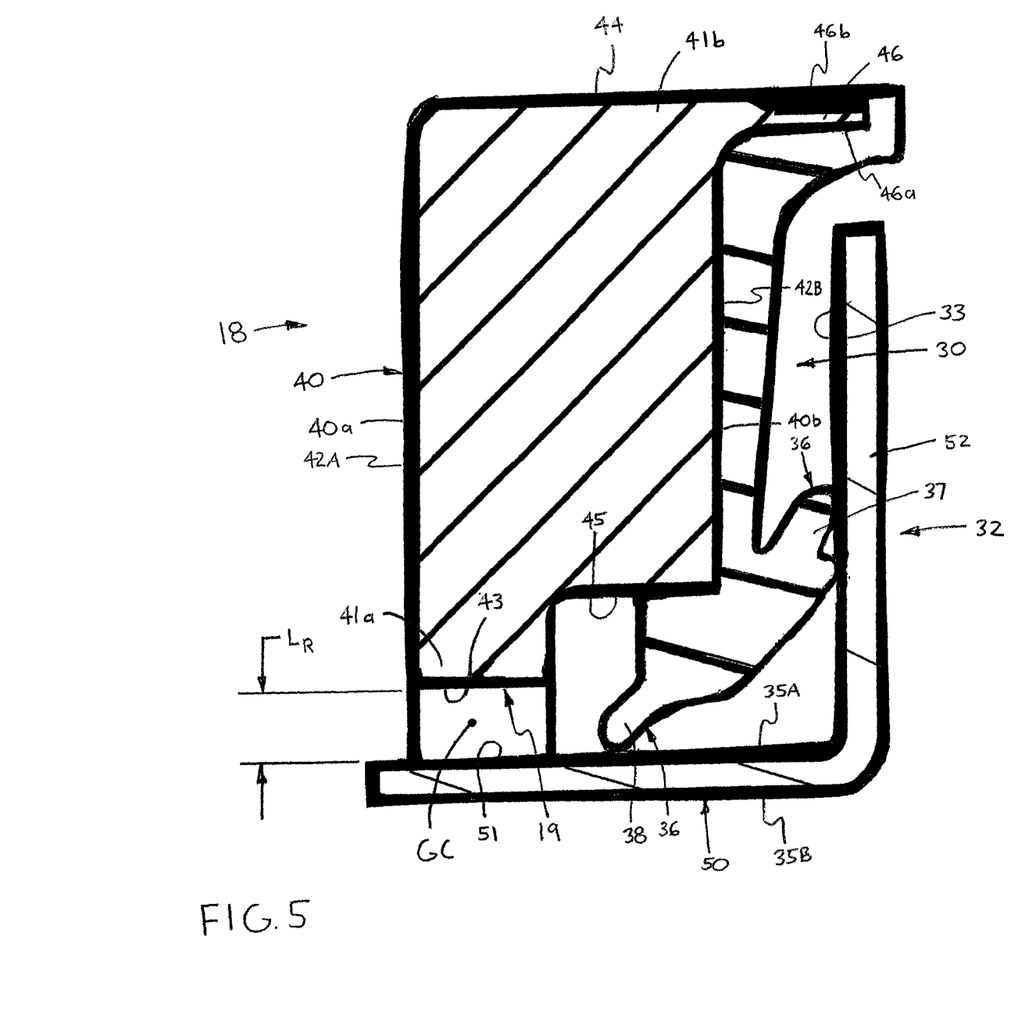
FIG. 5 is a greatly enlarged, cross-sectional view of the first construction combination displacement limiter and seal shown separate from the remainder of the hub bearing unit.

Furthermore, the rigid seal member 32 is formed of a generally rigid material such as steel, aluminum, rigid plastic, etc., is preferably generally L-shaped including an axial portion 50 and a radial portion 52 and functions generally as a "flinger". More specifically, the rigid member axial portion 50 provides the outer circumferential seal engagement surface 35A and has an opposing inner circumferential surface 35B frictionally engaged with the inner ring outer surface 13 to couple the seal member 32 with the inner ring 12. Also, a section of the outer circumferential surface 35A of the axial portion 50 provides a limiter contact surface 51 engageable by the limiter stop surface 19 when the inner ring 12 displaces relative to the outer ring 14, as shown in FIG. 4. Further, the rigid member radial portion 50 provides the radial seal engagement surface 33 and functions to "fling" or direct fluids and solid materials contacting the surface 33 radially outwardly and generally away from the axial sealing lip 37 during rotation of the inner ring 12.

Although the displacement limiter 18 is preferably mounted to a fixed outer ring 14 when provided to function as a carrier for the sealing member 30, the limiter 18 may alternatively be coupled with and extend outwardly from a fixed inner ring 12, with the rigid seal member 32 being mounted as appropriate to a rotatable outer ring 14 (structure not shown). As further alternatives, the limiter 18 may be coupled with a rotatable inner ring 12 or a rotatable outer ring 14, which carries a rotatable sealing member 30 sealingly engageable with a fixed rigid member 32 coupled with a non-rotatable outer ring 14 or non-rotatable inner ring 12, respectively (no alternatives shown). As yet another alternative, the seal 20 may be formed without a rigid seal member or flinger, with the sealing member 30 being formed with only one or more radial sealing lips 38 sealingly engageable with the inner ring outer surface 13, the outer ring inner surface 15, or a circumferential surface of a member disposed on either ring 12, 14 (alternative structures not shown). The present invention encompasses these and all other appropriate alternative constructions as generally disclosed or suggested herein.

Referring now to FIGS. 6-10, when the annular sealing member 30 is sealingly engaged with the displacement limiter 18, and thus not carried thereby, the limiter 18 preferably functions as a flinger (as discussed below) and is coupled with the inner ring 12, with the wheel 1 being mounted to the inner ring 12 such that the ring 12 is rotatable about the central axis $A_C$. Preferably, the inner radial end 41A of the limiter body 40 has an axial extension 47 providing an outer circumferential seal engagement surface 47a and the outer radial end 41B has a radially-inwardly stepped section 48 adjacent to the stop surface 19. As such, the limiter body 40 is partially disposed within the rigid retainer 34 while the stop surface 19 is located externally of the retainer 34 to define the control gap GC with the inner surface 15 of the outer ring 14. Further, the inner radial end 41A of the limiter body 40 preferably has an inner circumferential surface 43 frictionally engaged with the outer surface 13 of the inner ring 12, preferably of an insert 62 as described below, to removably couple the limiter 18 with the ring 12.

Further, when the sealing member 30 is not mounted on the displacement limiter 18, the seal 20 preferably further includes the annular rigid retainer 34, which is most preferably coupled with the outer ring 14 and is generally L-shaped. Specifically, the retainer 34 includes an outer axial portion 34a frictionally engaged with the inner surface of the outer ring 14 and a radial portion 34b extending inwardly from the axial portion 34b. The annular sealing member 30 is coupled with the rigid retainer 34, preferably bonded to both the radial portion 34b and the axial portion 34a. The sealing member 30 preferably has a primary axial sealing lip 37 sealingly engageable with the inwardly-facing radial surface 42A of the limiter 18, a radial sealing lip 38 sealingly engaged with the outer circumferential surface 47a of the limiter axial extension 47, and a dust lip 39.

Figure 9:
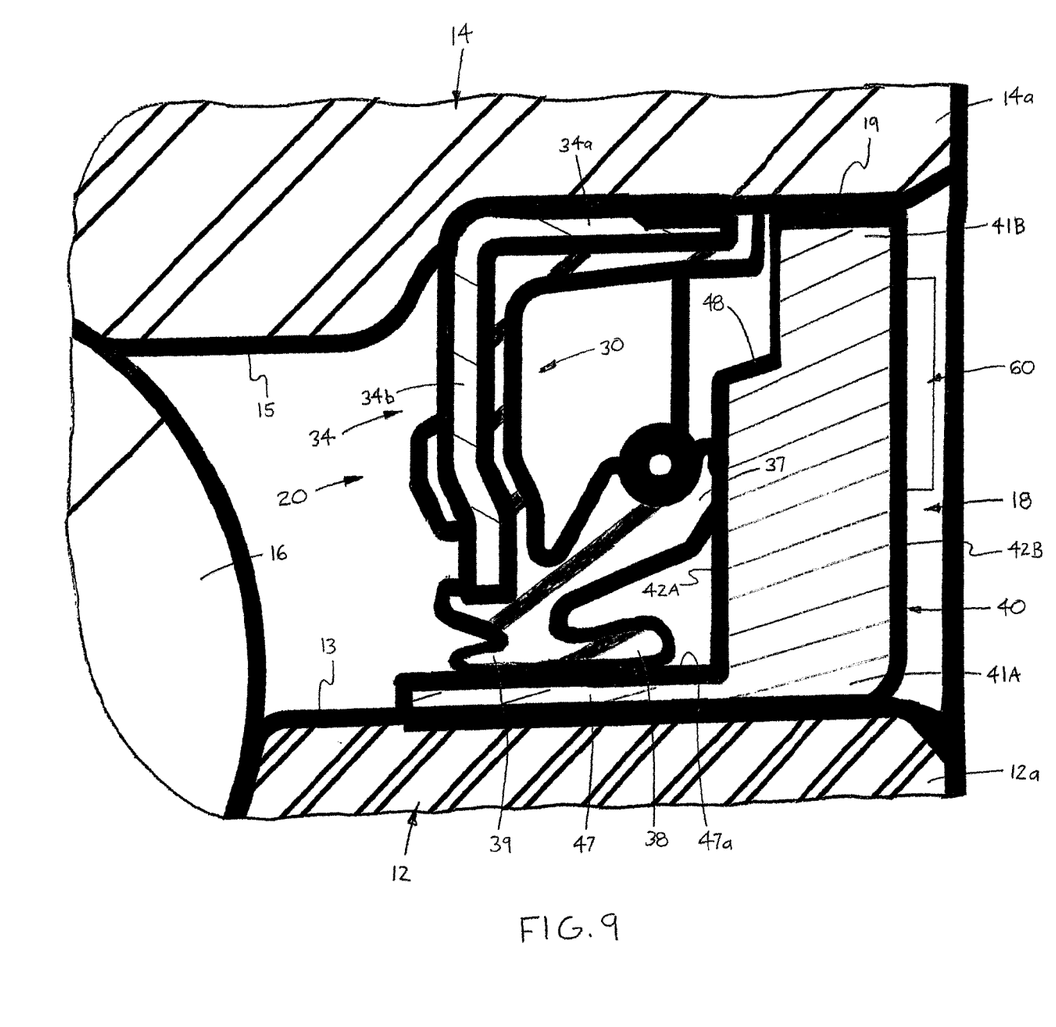
FIG. 9 is another view of portion of FIG. 8, showing the limiter engaged with the outer ring.
Figure 10:
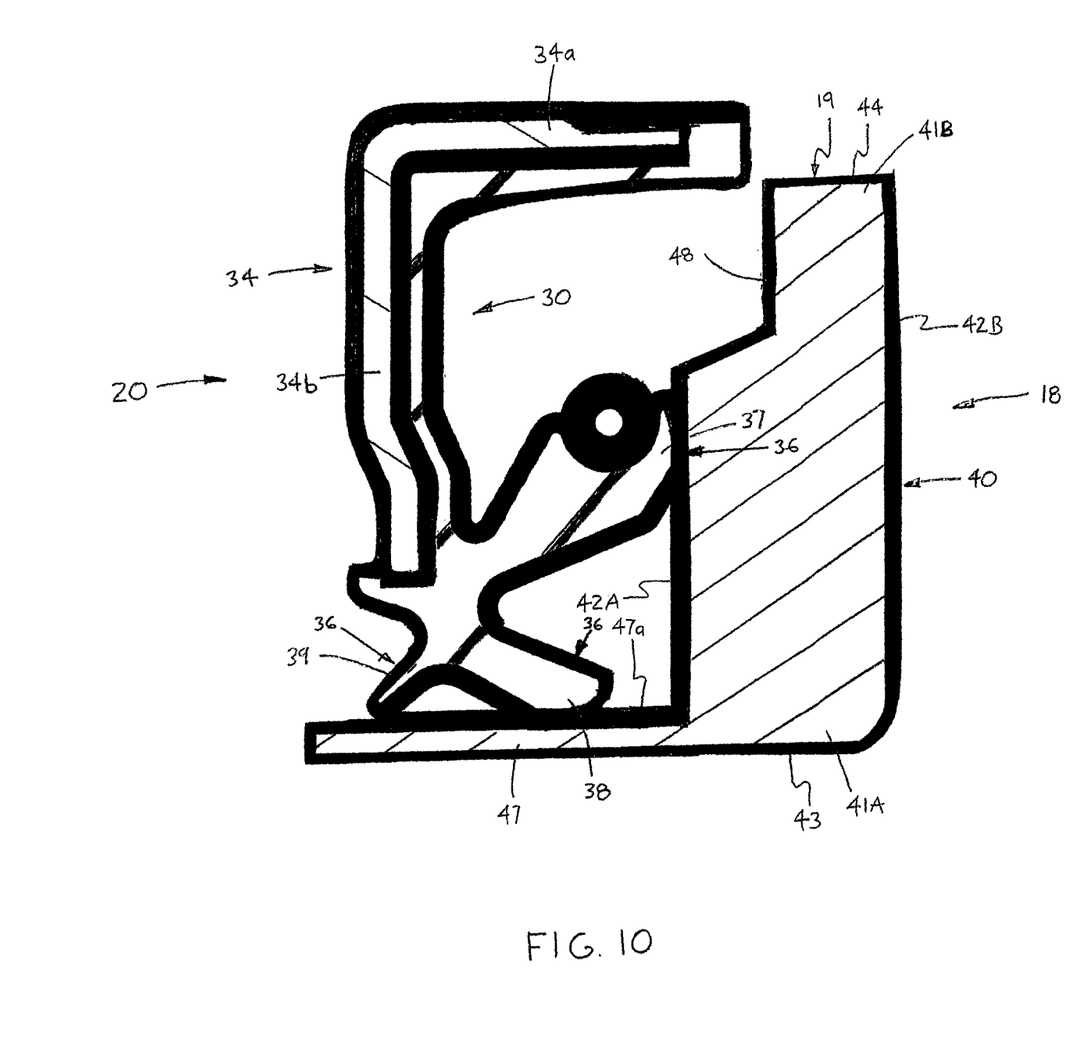
FIG. 10 is a greatly enlarged, cross-sectional view of the second construction combination displacement limiter and seal shown separate from the remainder of the hub bearing unit.

With the above limiter and seal structure, the displacement limiter 18 further functions as a flinger to direct fluids and solids away from the sealing member 30. That is, due to the rotation of the limiter 18 with the inner ring 12, centrifugal force causes fluids and solids on the radial surface 42A of the limiter body 40 to be directed radially-outwardly away from the axial seal lip 36, thereby increasing the effectiveness of the seal 20. Also, due to the limited space through the control gap GC, the displacement limiter 18 provides the function of a labyrinth seal in preventing or at least limiting the flow of fluids or solids through the control gap GC and toward the axial seal lip 36. Further, as shown in FIG. 9, the displacement limiter 18 may also function as a mounting bracket or support for a sensor encoder 60, which may be coupled with or mounted to the outwardly facing radial surface 43B of the limiter body 40 to provide a target for a sensor (not shown) coupled with the outer ring 14.

Although the displacement limiter 18 is preferably mounted to a rotating inner ring 12 when provided to function as a slinger, the limiter 18 may alternatively be coupled with an extend inwardly from a rotating outer ring, with the retainer and sealing member 30 being mounted as appropriate to a fixed inner ring 12. As a further alternative, the limiter 18 may be coupled with a fixed inner ring 12 or a fixed outer ring 14 and sealingly engaged by a sealing member 30 coupled to a rotatable outer ring 14 or a rotatable inner ring 12, respectively. The present invention encompasses these and all other appropriate alternative constructions as generally disclosed or suggested herein.

Referring to FIGS. 1, 2, 6 and 7, the wheel hub unit 10 is preferably a double row bearing 11 including two sets of inner and outer races and two sets of rolling elements. Specifically, the inner ring 12 has a first, inboard inner race 23A and a second, outboard inner race 23B spaced axially from the first inner race 23A. Likewise, the outer ring 14 has a first, inboard outer race 27A and a second, outboard outer race 27B spaced axially from the first outer race 27A. Further, a first plurality or row 17A of rolling elements 16 is disposed between and rollable upon the first inner race 23A and the first outer race 27A and a second plurality/row 17B of rolling elements 16 is disposed between and rollable upon the second inner race 27B and the second outer race 27B. With the preferred double row bearing 11, the displacement limiter 18 may alternatively be disposed between the two rows 17A, 17B or even outboard of the second or outboard row 17B of rolling elements 16. Although a double row bearing is preferred, the wheel hub unit 10 may alternatively be formed so as to include only a single row (not shown) of rolling elements 16 for certain applications.

Figure 2:
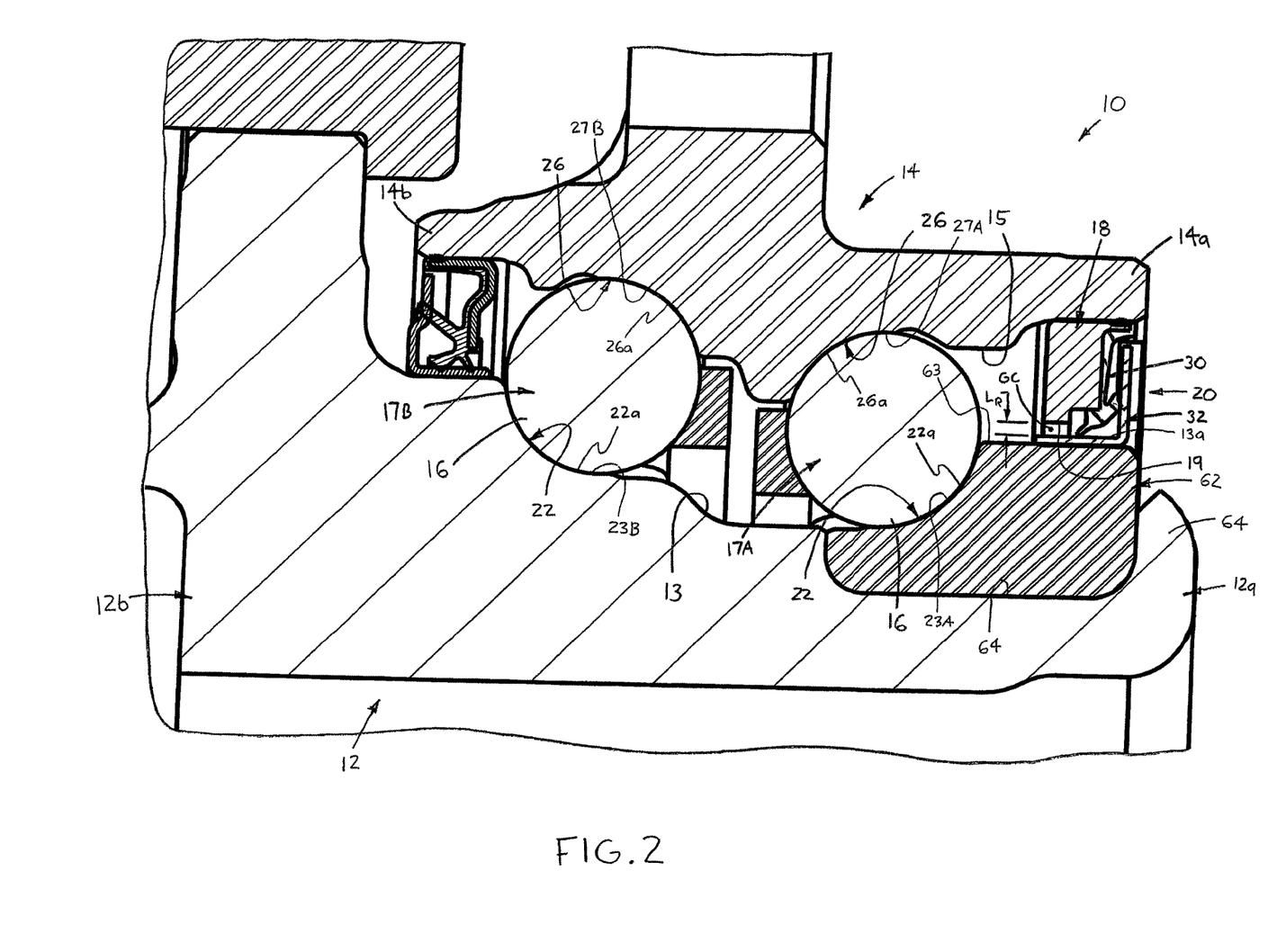
FIG. 2 is an enlarged view of an upper portion of FIG. 1.
Figure 3:
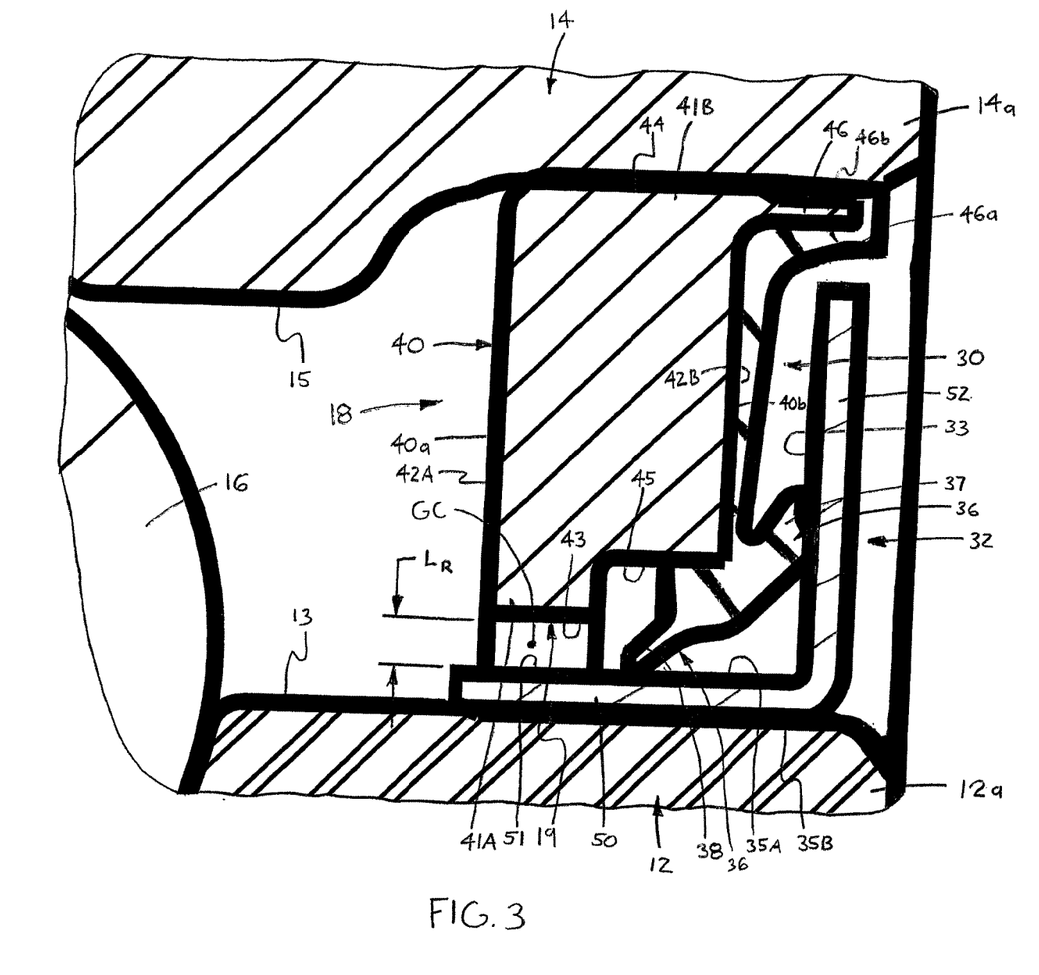
FIG. 3 is a greatly enlarged view of portion of FIG. 1, showing the first construction combination displacement limiter and seal with the limiter spaced from the inner ring.
Figure 7:
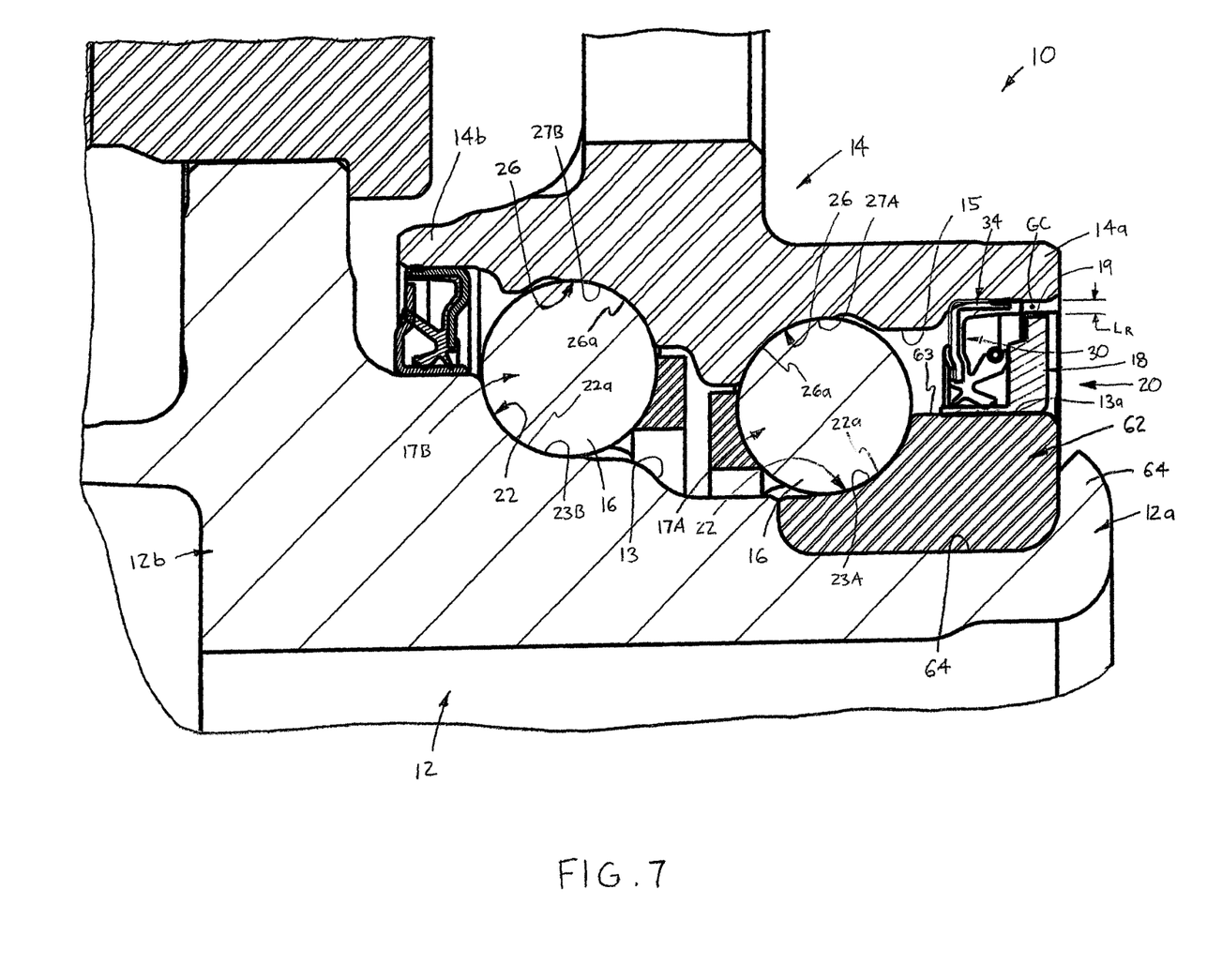
FIG. 7 is an enlarged view of an upper portion of FIG. 6.
Figure 8:
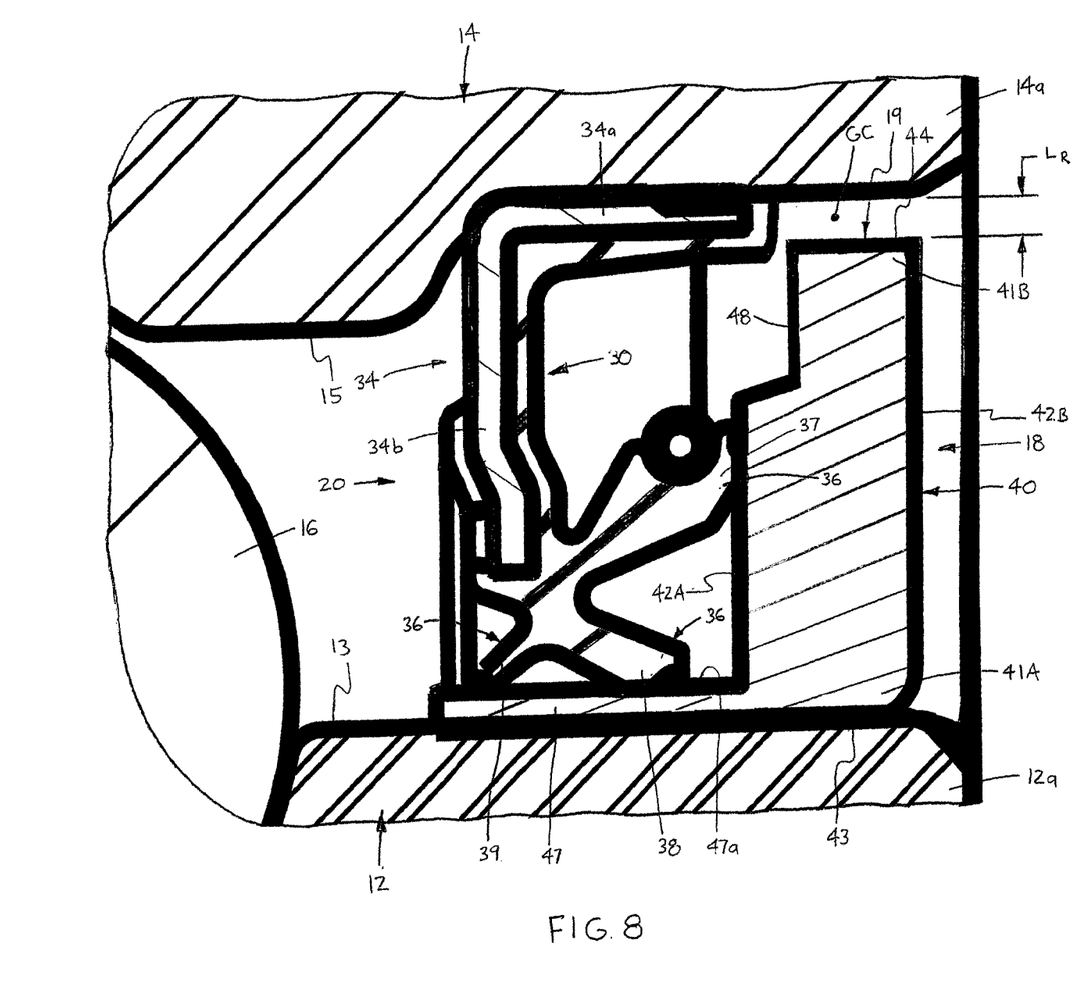
FIG. 8 is a greatly enlarged view of portion of FIG. 6, showing the second construction combination displacement limiter and seal with the limiter spaced from the outer ring.

Referring to FIGS. 2 and 7, the inner ring 12 preferably includes an annular insert 62 disposed within an annular groove 64 extending inwardly from the ring outer surface 13 and retained by a flange or rolled end 64 formed on the ring inboard end 12a. The insert 62 has an outer circumferential surface 63 providing the first, inboard inner race 23A and a section 13a of the ring outer surface 13, with either the seal rigid member 32 or the limiter 18 preferably being disposed about the outer surface section 13a, and thus mounted about the insert 62. Alternatively, the rigid member 32 or the displacement limiter 18 may be integrally formed with the insert 62 so as to extend radially outwardly from the insert outer surface 63 (structure not shown). Further, the second, outboard inner race 23B is preferably formed directly on the outer surface 13 of the inner ring 12, and both the first and second outer races 27A, 27B are formed directly on the inner surface 15 of the outer ring 14. However, the second inner race 23B or either or both of the outer races 27A, 27B may alternatively be provided by an appropriate annular insert (none shown) or/and the first inner race 23A may be alternatively directly formed on the outer surface 13 of the inner ring 12.

Figure 6:
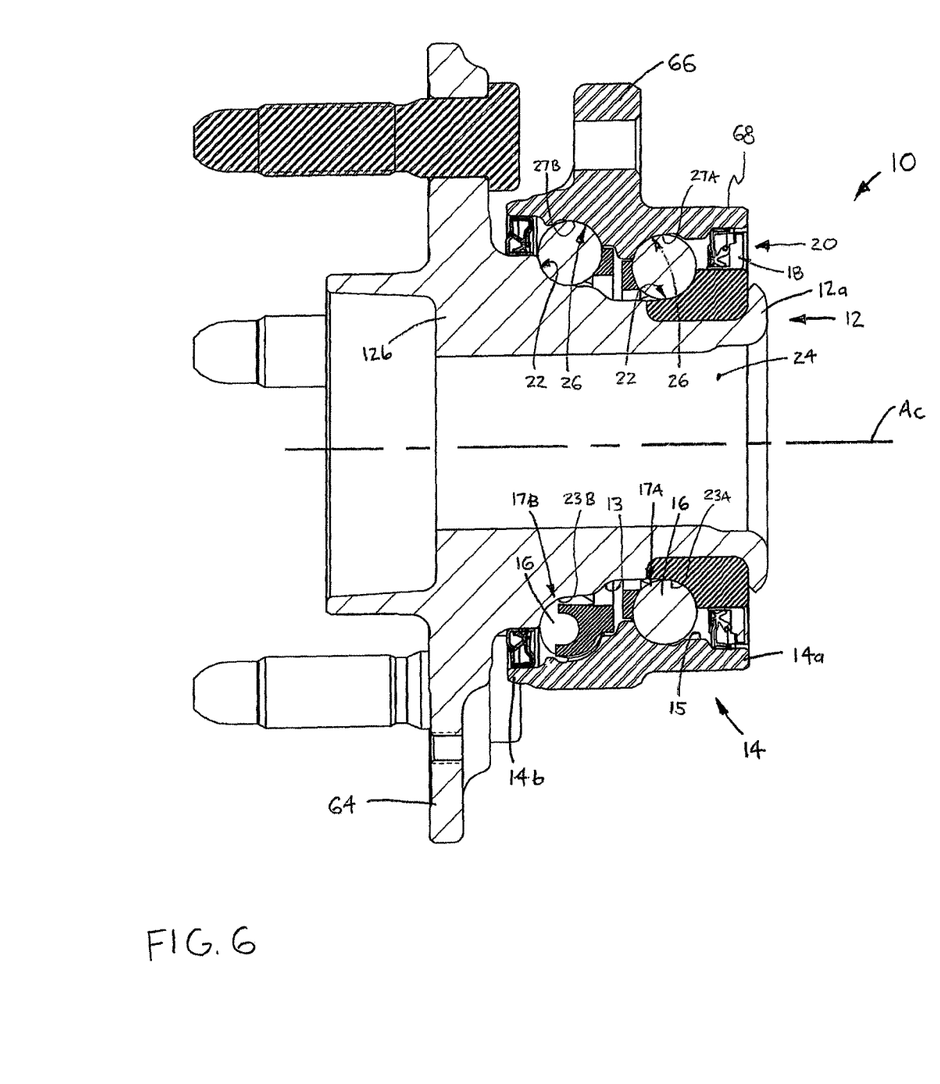
FIG. 6 is an axial cross-sectional view of a hub bearing unit in accordance with the present invention, shown with a second construction combination displacement limiter and seal.

Referring now to FIGS. 1 and 6, in certain presently preferred constructions as depicted, the inner ring 12 is a hub or "flanged inner ring" and includes a flange 64 formed on and extending radially outwardly from the inner ring outboard end 12b. The flange 64 is connectable with a wheel 1, preferably by means of a plurality of bolts 65, to thereby mount the wheel 1 to the wheel hub unit 10. As discussed above, in such a construction, the inner ring 1 is rotatable about the central axis $A_C$ and preferably the central bore 24 receives an end of a rotatable shaft 3 (FIG. 1) of the vehicle. Also, the outer ring 14 is connected with a steering mechanism or a suspension, preferably through a central flange 66 extending radially outwardly from the outer circumferential surface 68. However, the wheel hub unit 10 may alternatively be formed such that the outer ring 14 functions as a hub and has a flange (not shown) formed on and extending radially outwardly from the outboard end 14b of the ring 14. The flange is connectable with the wheel and the outer ring 14 is rotatable about the central axis $A_C$. In such a construction, the inner ring 12 is preferably mounted on a stub shaft (not shown) connected with a steering mechanism, a suspension and/or a powertrain.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A hub bearing unit for rotatably coupling a wheel with a vehicle, the hub bearing unit comprising:
   an inner ring having an inboard axial end, an outboard axial end, an outer circumferential surface and a bearing inner race disposed on the outer surface;
   an outer ring disposed about the inner ring and having an inboard axial end, an outboard axial end, an inner circumferential surface and a bearing outer race disposed on the ring inner surface, one of the inner ring and the outer ring being coupled with the wheel so as to be rotatable about a central axis and the other one of the inner ring and the outer ring being fixedly coupled with the frame;
   a plurality of rolling elements rollable upon the inner race and the outer race to rotatably couple the inner ring and the outer ring;
   a generally annular displacement limiter extending radially from the inner ring outer surface or from the outer ring inner surface, the limiter having a circumferential stop surface spaced radially from the outer ring inner surface or from the inner ring outer surface, the stop surface engaging with the outer ring or with the inner ring when one of the inner ring and the outer ring displaces radially relative to the other one of the inner ring and the outer ring; and
   a seal including an annular sealing member coupled with one of the inner ring and the outer ring and sealingly engageable with the limiter or mounted on the limiter and sealingly engageable with one of the inner ring and the outer ring or with a rigid seal member coupled with one of the inner ring and the outer ring.

2. The hub bearing unit as recited in claim 1 wherein an annular control gap is defined between the stop surface of the limiter and an outer circumferential surface of the inner ring outer surface or an inner circumferential surface of the outer ring, the displacement limiter being sized such that the control gap has a predetermined radial length to limit relative radial displacement between the inner ring and the outer ring to the control gap radial length.

3. The hub bearing unit as recited in claim 2 wherein the radial length of the control gap has a value of 0.3 millimeters or less.

4. The hub bearing unit as recited in claim 1 wherein the limiter is located axially between the plurality of rolling elements and the inboard axial end of each one of the inner ring and the outer ring so as to limit relative radial displacement between the inboard axial end of the inner ring and the inboard axial end of the outer ring.

5. The hub bearing unit as recited in claim 1 wherein one of:
   the limiter includes a generally annular body with an inner radial end coupled with or integrally formed with the inner ring and an opposing, outer radial end spaced radially inwardly from the outer ring outer surface and having an outer circumferential surface providing the stop surface; and
   the limiter includes a generally annular body with an outer radial end coupled with or integrally formed with the outer ring and an opposing, inner radial end spaced radially outwardly from the inner ring outer surface and having an inner circumferential surface providing the stop surface.

6. The hub bearing unit as recited in claim 1 wherein the limiter includes a generally annular body removably coupled with the inner ring or with the outer ring.

7. The hub bearing unit as recited in claim 1 wherein the sealing member is disposed on the limiter and has at least one sealing lip sealingly engageable with at least one of the inner ring outer surface, the outer ring inner surface and a surface of the rigid seal member.

8. The hub bearing unit as recited in claim 7 wherein the wheel is coupled with the inner ring such that the inner ring is rotatable about the central axis, the limiter is coupled with the outer ring and the rigid seal member is coupled with the inner ring and has a radial surface for directing fluids and solid materials radially outwardly and generally away from the at least one sealing lip during rotation of the inner ring.

9. The hub bearing unit as recited in claim 7 wherein the sealing member includes at least one radial sealing lip sealingly engageable with a circumferential surface of one of the inner ring, the outer ring and a portion of the rigid seal member and at least one axial sealing lip sealingly engageable with a radial surface of the rigid seal member.

10. The hub bearing unit as recited in claim 1 wherein the seal further includes an annular rigid retainer coupled with the inner ring or with the outer ring and the annular sealing member is coupled with the rigid retainer and has at least one sealing lip sealingly engageable with a radial surface of the limiter.

11. The hub bearing unit as recited in claim 10 wherein the wheel is coupled with the inner ring such that the inner ring is rotatable about the central axis, the seal rigid retainer is coupled with the outer ring and the limiter is coupled with the inner ring such that the limiter radial surface directs fluids and solid materials radially outwardly and generally away from the at least one sealing lip during rotation of the inner ring.

12. The hub bearing unit as recited in claim 10 wherein the sealing member includes at least one radial sealing lip sealingly engageable with a circumferential surface of one of the inner ring and the outer ring and at least one axial sealing lip sealingly engageable with the radial surface of the limiter.

13. The hub bearing unit as recited in claim 1 wherein the sealing member is formed of an elastomeric material.

14. The hub bearing unit as recited in claim 1 further comprising a sensor encoder coupled with the limiter.

15. The hub bearing unit as recited in claim 1 wherein:
   the inner race is a first inner race and the inner ring further has a second inner race spaced axially from the first inner race;
   the outer race is a first outer race and the outer ring further has a second outer race spaced axially from the first outer race;
   the plurality of rolling elements is a first plurality of rolling elements and the hub bearing unit further comprises a second plurality of rolling elements rollable upon the second inner race and upon the second outer race.

16. The hub bearing unit as recited in claim 1 wherein one of:
   the inner ring has a flange formed on the inner ring outboard end, the flange being connectable with a wheel, the inner ring is rotatable about central axis and the outer ring is connected with a steering mechanism or a suspension; and
   the outer ring has a flange formed on the outer ring outboard end, the flange being connectable with a wheel, the outer ring is rotatable about central axis and the inner ring is connected with a steering mechanism or a suspension.

17. A hub bearing unit for rotatably coupling a wheel with a vehicle, the hub bearing unit comprising:
   an inner ring having an inboard axial end, an outboard axial end, an outer circumferential surface and a bearing inner race disposed on the outer surface;
   an outer ring disposed about the inner ring and having an inboard axial end, an outboard axial end, an inner circumferential surface and a bearing outer race disposed on the ring inner surface, one of the inner ring and the outer ring being coupled with the wheel so as to be rotatable about a central axis and the other one of the inner ring and the outer ring being fixedly coupled with the frame;
   a plurality of rolling elements rollable upon the inner race and the outer race to rotatably couple the inner ring and the outer ring;
   a generally annular displacement limiter extending radially from the inner ring outer surface or from the outer ring inner surface, the limiter having a circumferential stop surface spaced radially from the outer ring inner surface or from the inner ring outer surface, the stop surface engaging with the outer ring or with the inner ring when one of the inner ring and the outer ring displaces radially relative to the other one of the inner ring and the outer ring; and
   a seal including an annular sealing member coupled with one of the inner ring and the outer ring and sealingly engageable with the limiter.

18. The hub bearing unit as recited in claim 17 wherein:
   the wheel is coupled with the inner ring such that the inner ring is rotatable about the central axis;
   the limiter includes a generally annular body with an inner radial end coupled with or integrally formed with the inner ring, an opposing, outer radial end spaced radially inwardly from the outer ring inner surface and having an outer circumferential surface providing the stop surface, and a radial engagement surface extending between the inner and outer radial ends; and
   the seal further includes an annular rigid retainer coupled with the outer ring and the annular sealing member is coupled with the rigid retainer and has at least one axial sealing lip sealingly engageable with the engagement surface of the limiter.

19. A hub bearing unit for rotatably coupling a wheel with a vehicle, the hub bearing unit comprising:
- an inner ring having an inboard axial end, an outboard axial end, an outer circumferential surface and a bearing inner race disposed on the outer surface;
- an outer ring disposed about the inner ring and having an inboard axial end, an outboard axial end, an inner circumferential surface and a bearing outer race disposed on the ring inner surface, one of the inner ring and the outer ring being coupled with the wheel so as to be rotatable about a central axis and the other one of the inner ring and the outer ring being fixedly coupled with the frame;
- a plurality of rolling elements rollable upon the inner race and the outer race to rotatably couple the inner ring and the outer ring;
- a generally annular displacement limiter extending radially from the inner ring outer surface or from the outer ring inner surface, the limiter having a circumferential stop surface spaced radially from the outer ring inner surface or from the inner ring outer surface, the stop surface engaging with the outer ring or with the inner ring when one of the inner ring and the outer ring displaces radially relative to the other one of the inner ring and the outer ring; and
- a seal including an annular sealing member disposed on the limiter and sealingly engageable with at least one of the inner ring, the outer ring and a rigid seal member coupled with one of the inner ring and the outer ring.

20. The hub bearing unit as recited in claim 19 wherein:
- the wheel is coupled with the inner ring such that the inner ring is rotatable about the central axis;
- the limiter includes a generally annular body with an outer radial end coupled with or integrally formed with the outer ring, an opposing, inner radial end spaced radially outwardly from the inner ring outer surface and having an inner circumferential surface providing the stop surface; and
- the seal includes the rigid seal member, the rigid seal member has a radial engagement surface and the sealing member includes at least one axial sealing lip sealing engageable with the rigid member engagement surface.

* * * * *